Figures 1, 2:
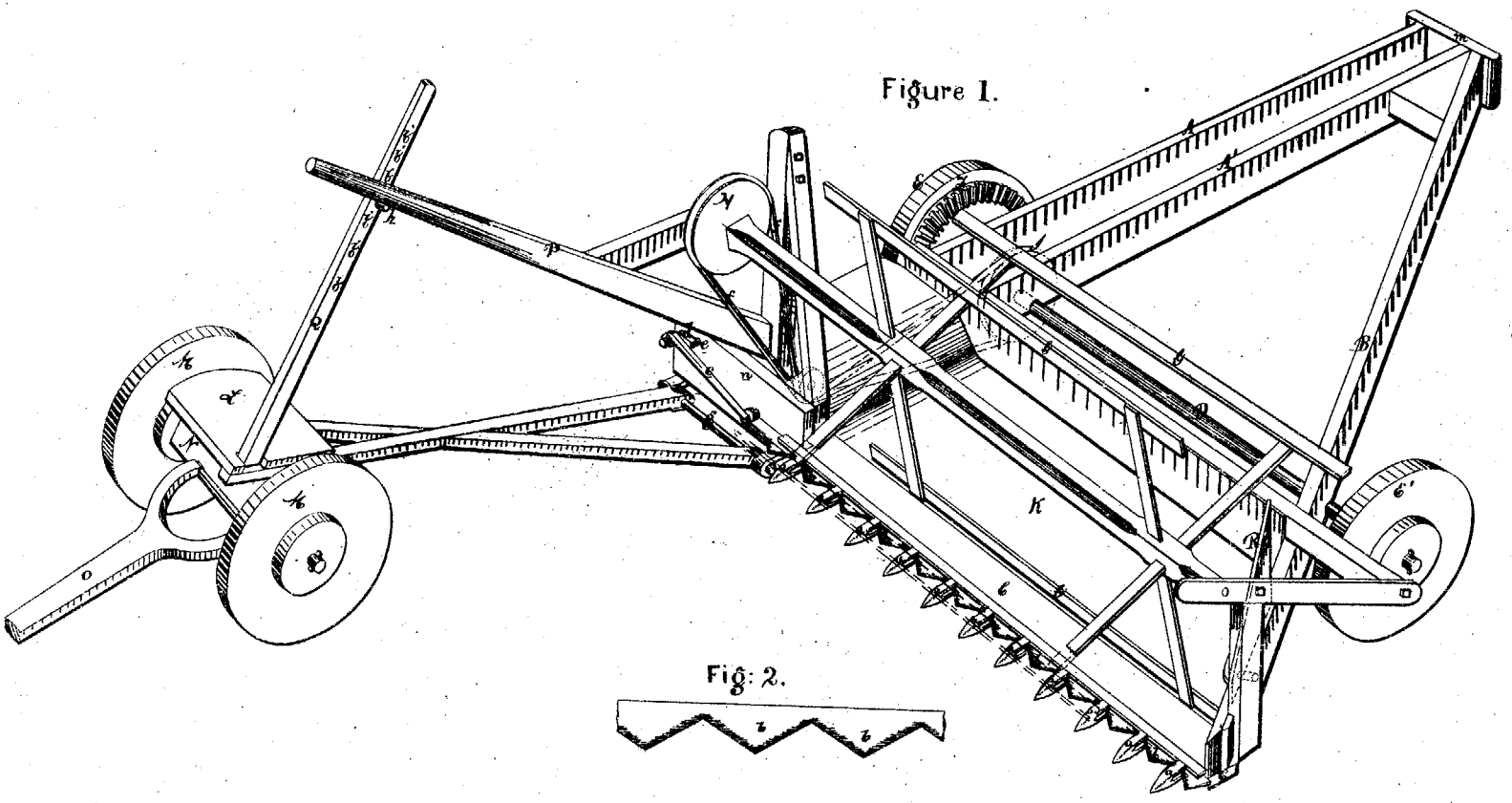

J. H. Manny.
Mower.

No. 286 Reissued Jan. 2 1855

UNITED STATES PATENT OFFICE.

JOHN H. MANNY, OF ROCKFORD, ILLINOIS.

IMPROVEMENT IN MOWING-MACHINES AND HARVESTERS.

Specification forming part of Letters Patent No. 8,385, dated September 23, 1851; Reissue No. 286, dated January 2, 1855.

*To all whom it may concern:*

Be it known that I, JOHN H. MANNY, of Rockford, in the county of Winnebago and State of Illinois, (formerly of Waddam's Grove, in the county of Stephenson and State aforesaid,) have invented certain new and useful Improvements in Reaping and Mowing Machines, of which the following is a full, clear, and exact description, reference being had to the accompanying drawing, which forms part of this specification, and in which the figure represents a view in perspective of my machine complete.

Reaping-machines may be divided into numerous classes, according to certain peculiarities in their construction and mode of operation.

For the purpose of giving a clearer idea of the nature and object of the improvement which is the subject of this patent it will be sufficient to divide them into two classes only—one, in which the cutter is placed on the front end of the machine, directly before the horses which travel in the swath being cut, and the other, in which the cutter projects from one side of that part of the machine to which the horses are harnessed and cuts one swath while the horses are traveling in a parallel path in the adjacent swath. The principal advantages which the first class of machines possess is the fair and even manner in which they support the cutter in a position parallel to the general surface of the ground, and the ease and convenience with which the gearing can be connected with and operate the cutting mechanism. The objections to this class of machines are their great length, which renders it difficult to turn them, and the great distance of the driver of the horses behind the cutter, which renders his position unfavorable for seeing when it is not working properly and when it is approaching stones or other obstructions. These with other disadvantages have so far overbalanced the advantages of this form of machine that it has almost everywhere been abandoned. The advantages of the other class of machines are that, the horses being in front, the driver occupies a position opposite to or in advance of the cutter, where he can witness its operations and have a better opportunity to regulate it and shun obstructions. Machines of this class are also shorter than the other, and therefore turn more easily. The disadvantages attending this form of machine are comparatively few, and arise mainly from the necessity of drawing it by one corner. The most important of these is the tendency which the outer end of the finger-bar and cutter have to droop, which causes the grass to be cut closer to the ground at one side of the swath than at the other, one side being cut too low and the other too high. Various attempts have heretofore been made to cure this defect, but with little success, for when this difficulty has been nearly or quite removed it has only been by constructing a ponderous frame immediately in the rear of the cutter, which, besides augmenting the cost, weight, and draft of the machine, greatly impedes the proper discharge of the grain or grass after it is cut. As such a supporting-frame is so objectionable, it has been very generally abandoned, and as a substitute the finger-bar has been enlarged so much and secured so firmly to the frame of the carriage as to be self-supporting. When, however, this bar has been thus enlarged to the dimensions of a beam of a foot or more in width it has been found that the weight and draft of the machine have been greatly increased, and grass is liable to lodge upon the bar and clog and load the machine, instead of falling over, as it did while the bar was narrow, and cut the grass at unequal heights on the two sides of the swath.

The foregoing and other defects I have remedied by my improvements, which enable me to construct a machine with a cutter projecting from one side, and without a heavy finger-bar or cumbrous frame-work to maintain the two ends of the cutter at equal distances from the ground. The improvement which produces this highly important result consists in hanging the outer end of the finger-bar which supports the cutter upon one end of a lever whose fulcrum is the axle of the carriage or a wheel, a runner placed beneath it, or other equivalent support, while the inner end of the lever is held down by the frame, so as to raise the outer end and hold up the outer extremity of the cutter-bar and cutter. By the vertical support which the lever gives to the cutter-bar the outer extremity of the cutter is always maintained at the same height as the inner end, and all tendency which it has to sag is effectually counteracted. This lever may also be so arranged as to give horizontal support to the finger-bar as a brace by allowing it to extend diagonally, as shown in the drawing, so as to form one side of a triangle, of which the inner bar is another, and the frame which supports the gearing and driving-wheel is a third.

The machine represented in the accompanying drawing, to which my improvements are applied, consists of two principal parts connected together by a hinged draft-bar. The first is a two-wheeled truck or leading carriage, to which the horses are harnessed, and which carries the driver. The second is also a two-wheeled carriage, and it supports the cutter and gearing. This cutter-carriage consists of a pair of parallel side rails, A A′, connected by transverse bars *m* and *n*. These together constitute the frame which supports the driving-wheel and the driving-gear. From the inner rail, A′, the bar C, which supports the cutter and the fingers, projects at right angles, and its outer extremity is held up by the end of the lever extending across to the rear end of the gear-frame and resting between its extremities upon an axle, D, on which the supporting-wheels E E′ turn. From this arrangement it will be seen that the outer end of the finger-bar is supported on the outer end of the lever B. This end of the lever, with the weight of the bar supported thereon, is counterbalanced and held up by the weight of the frame to which its inner end is attached. As the gear-frame, as well as the lever, are both rigid and turn upon the axle as their common fulcrum, it follows that when, by the raising of the front end of the gear-frame, the inner end of the finger-bar and cutter is raised the rear end of the gear-frame and the rear end of the lever B will be depressed proportionately, and will raise in a corresponding degree the outer end of the finger-bar, so as to maintain it at the same elevation under all circumstances as the inner end, so far as rigidity in the frame can accomplish that object.

The front bar, C, of the frame sustains the cutting apparatus. This consists of a series of stationary fingers, *a a*, which project forward, and as the machine is advanced enter the standing grain, and of a reciprocating sickle-blade, *b*. The latter is serrated, as represented in the drawing, and its edges are sickled. The sickle is connected at one extremity by means of a rod, *c*, with the wrist of a crank, *d*, which is secured to the front extremity of a shaft, *e*. This shaft extends backward toward the axle D, and carries at its hinder extremity a beveled pinion, whose teeth engage with those of a corresponding beveled wheel, F, secured to one of the running wheels E, so that the latter becomes the driving-wheel of the machine, and in running over the ground causes the crank-shaft to revolve and impart a reciprocating movement to the sickle-blade.

To facilitate the operation of the cutting apparatus, a reel, G, is employed to press the grass or grain toward the cutters and turn it over the bar upon the ground or a platform, as the case may be. The shaft of this reel turns upon bearings in the frame of the machine. It is fitted with a belt-pulley, H, which is encircled by a belt leading from a corresponding pulley, I, on the axle D, so that as the latter turns with the wheel E the reel is caused to revolve.

When the machine is arranged for cutting grain and is in operation the grain cut falls upon a platform, K, behind the cutting apparatus and is raked off at the side of the machine by a person who stands upon the frame behind the platform.

In order to leave the side of the platform at which the grain is discharged perfectly free for the action of the raker, the belt *f*, by which motion is conveyed to the reel-shaft, is deflected from its direct course between the driving and leading pulleys I and H by passing it under guide-pulleys which are pivoted to the frame of the machine beneath the front edge of the raking-platform.

The leading carriage, to which the team is harnessed, consists of a pair of wheels, M, an axle, N, a stand, L, for the driver, a tongue, hounds, &c., to harness the horses to, and a standard for aiding in maintaining the cutter at the proper height. This leading carriage is connected with the rear or cutter carriage by means of a draft-bar, which is connected to the leading carriage by a king-bolt in the same manner that a perch is usually connected to the front axle of a wagon. This permits the axle-tree and draft-bar to turn freely. The hinder extremity of the draft-bar, which in this example is forked, is connected by a horizontal bolt, *g*, with the finger-bar on the hinder carriage, so that this carriage can tip upon the axle D of its running-wheels without affecting the front axle-tree, N, to which the tongue O is secured. In order to control this tipping of the hinder carriage, and consequently to regulate the distance of its front rail and the cutting apparatus thereto attached from the ground, a strong bar or arm, P, projects from the frame of the hinder carriage over the frame of the front one and moves up and down by the side of a standard, Q, erected upon the front part of the driving-platform on the forward carriage. The bar P may be held against the standard Q by a rectangular staple, which embraces the standard. This standard is perforated with a series of holes, *i*, to which a pin, *h*, is fitted, that can be shifted from one hole to another. The projecting bar P is rigidly connected with the front part of the hinder-carriage frame, and hence when it is raised this portion of the carriage is correspondingly raised and the cutting apparatus is lifted from the ground. It is then prevented from lowering down again by passing the pin *h* through the standard in the hole immediately beneath the bar P. This pin, although it prevents the bar P, and consequently the front of the hinder carriage, from sinking too low, does not prevent it from rising when the finger-bar strikes any unobserved protuberance on the ground, and hence, while this arrangement affords a convenient means of regulating the distance of the cutting apparatus from the ground, it diminishes the risk of the breakage from collision with an unnoticed protuberance on the surface of the ground.

When this machine is used for cutting grain the driver stands upon the platform L of the front carriage, where he can drive the horses, observe the height of the grain, the nature of the surface of the ground, the position of obstructions, and can at the same time regulate the height of the cutter by raising or lowering the bar P, and with it the cutting apparatus, as circumstances may require.

The raker stands upon the frame of the hinder carriage behind the raking-platform K, where he can readily rake off the grain falling thereon and discharge it at the side of the machine most distant from the standing grain.

When the machine is used for mowing grass or other substances which do not require to be bound into sheaves the platform is removed and the cut grass falls directly over the finger-bar and cutter upon the surface of the ground behind it, and is left in the track or wake of the machine. As the cut grass falling at that side of the machine nearer the standing grass would be in the way of the team and wheels when making a succeeding cut, and would also be injured by being trampled, I secure an adjustable hinged guard-plate, R, to the inner side of the oblique lever B. When the raking-platform K is in use this guard-plate is turned up, as is represented in Fig. 1; but when the platform is removed this guard-plate is depressed, and then turns the cut grass falling at that end of the cutting apparatus away from the standing grass, thus leaving a clear space for the wheels to run on and the team to walk in while making a succeeding cut.

What I claim as my invention, and desire to secure by Letters Patent, is—

The combination of the bar that supports the cutter with a diagonal lever held down at its inner end, substantially as described, and resting upon the axle of the carriage as a fulcrum, or upon some other equivalent support that will perform the function of a fulcrum, whereby the outer end of the cutter-bar is held up, substantially as herein set forth.

In testimony whereof I have hereunto subscribed my name.

JOHN H. MANNY.

Witnesses:

P. H. WATSON,

F. G. DE FONTAINE.